United States Patent
Fujieda (10) Patent No.: US 9,224,065 B2
(45) Date of Patent: Dec. 29, 2015

(54) CHARACTER-RECOGNITION METHOD AND CHARACTER-RECOGNITION DEVICE AND PROGRAM USING SAID METHOD

(71) Applicant: OMRON Corporation, Kyoto-Shi, Kyoto (JP)

(72) Inventor: Shiro Fujieda, Kyoto (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 14/378,984

(22) PCT Filed: Nov. 28, 2012

(86) PCT No.: PCT/JP2012/080702
§ 371 (c)(1),
(2) Date: Aug. 15, 2014

(87) PCT Pub. No.: WO2013/121648
PCT Pub. Date: Aug. 22, 2013

(65) Prior Publication Data
US 2015/0071546 A1  Mar. 12, 2015

(30) Foreign Application Priority Data
Feb. 17, 2012 (JP) ................. 2012-032889

(51) Int. Cl.
*G06K 9/46* (2006.01)
*G06K 9/62* (2006.01)
*G06K 9/34* (2006.01)

(52) U.S. Cl.
CPC .............. *G06K 9/6201* (2013.01); *G06K 9/342* (2013.01); *G06K 2009/6213* (2013.01); *G06K 2209/01* (2013.01)

(58) Field of Classification Search
CPC ................... G06K 2009/6213; G06K 9/342
USPC .......................................... 382/190
See application file for complete search history.

(56) References Cited

U.S. PATENT DOCUMENTS

2005/0216564 A1* 9/2005 Myers et al. .................. 709/206
2009/0285492 A1* 11/2009 Ramanujapuram et al. .. 382/209

FOREIGN PATENT DOCUMENTS

| EP | 2 154 632 A2 | 2/2010 |
|----|----|----|
| JP | 2-230484 A | 9/1990 |
| JP | 3-214286 A | 9/1991 |
| JP | 4-289988 A | 10/1992 |
| JP | 5-128299 A | 5/1993 |
| JP | 9-282417 A | 10/1997 |
| JP | 2010-44485 A | 2/2010 |

OTHER PUBLICATIONS

International Search Report for corresponding International Application No. PCT/JP2012/080702, mailed Jan. 29, 2013 (2 pages).

* cited by examiner

*Primary Examiner* — Manuchehr Rahmjoo
(74) *Attorney, Agent, or Firm* — Osha Liang LLP (57) ABSTRACT

A character-recognition device and method for imaging a character string, generating a grayscale image that corresponds to the character string, cutting out, from the grayscale image, individual characters in the character string, obtaining a coincidence of a character image that is being focused on for each of model images of a plurality of kinds of characters by sequentially focusing on cut-out character images to match the cut-out character images against the model images, and recognizing characters corresponding to the cut-out character images based on each coincidence.

7 Claims, 9 Drawing Sheets

CHARACTER-RECOGNITION METHOD AND CHARACTER-RECOGNITION DEVICE AND PROGRAM USING SAID METHOD

TECHNICAL FIELD

One or more embodiments of the present invention relate to character-recognition processing performed using image processing, particularly to a technology for recognizing a composite character including a pair of character elements arrayed in a width direction.

BACKGROUND ART

In the character-recognition processing, generally individual characters are cut out from a grayscale image generated by imaging a character string, and matching processing (model matching) is performed to each cut-out character using various character models to recognize a content of the character string. In the character cutting out processing, binarized data or grayscale data of the processing target image is projected to x- and y-axis directions, a portion corresponding to the character is extracted from a projection pattern generated on each axis, thereby specifying a region (hereinafter referred to as a "character region") corresponding to the individual characters.

In order to ensure accuracy of the matching processing, it is necessary to specify the character region in each recognition target character. However, in a composite character having a configuration in which independent character elements are arrayed in a width direction corresponding to the character string, sometimes the character elements are individually cut out to perform false matching processing.

Therefore, Patent Document 1 describes that, in the case that a character candidate having high reliability for a left-hand side of a previously-learned Chinese character is extracted, the false cutout is determined to be performed, and a character candidate suitable for the left-hand side of the Chinese character and a next character candidate are newly cut out as one character (see Paragraph No. 0033 and the like).

In the description of Patent Document 2, after the cutout of the character, tentative matching processing is performed to calculate matching reliability, a standard character length of a full-width character is decided based on the character candidate satisfying a condition that the matching reliability is greater than or equal to a predetermined reference value, all the characters of the recognition targets are cut out based on the recognized standard character length to perform final matching processing (see claim 1 and the like). Additionally, in the case that the character (for example, the Chinese characters "明" produced by a combination of "日" and "月") produced by a combination of two component characters is extracted in the tentative matching processing, the character is not used to decide the standard character length (see Paragraph Nos. 0015 to 0022, 0061 to 0068, 0089, and the like).

Patent Document 1: Japanese Unexamined Patent Publication No. 1997-282417

Patent Document 2: Japanese Unexamined Patent Publication No. 2010-44485

SUMMARY OF THE INVENTION

Patent Document 2 suggests that it is unclear whether the combination of a pair of character elements (such as "日" and "月" of the Chinese characters) expresses one character or two characters. In the composite character produced by the combination of the character elements each of which can be solely recognized as the character, there is a high risk of overlooking the false recognition because coincidence increases in the case that each character element is individually recognized.

However, Patent Document 1 only proposes a thought that failure in cutting out the character is recognized to perform the cutout processing again based on a feature of one of the character elements.

According to the description of Patent Document 2, when a width of the combination of the two character elements comes close to a standard character width, the combination is cut out as one character. However, there is a possibility of generating the false recognition when the character-recognition method described in Patent Document 2 is applied to a character string of European characters for example, which has a large variation in character size. The character-recognition method described in Patent Document 2 is not used in the case that the composite character is solely the recognition target.

One or more embodiments of the invention accurately recognizes the composite character without being influenced by the coincidence obtained by performing matching solely for the individual character element or the variation in size of the individual character element.

One or more embodiments of the invention is directed to a character-recognition method for cutting out individual characters in a character string from a grayscale image generated by imaging the character string, obtaining a coincidence of a character image being focused for each of model images of a plurality of kinds of characters by sequentially focusing on cut-out character images to match the cut-out character images against the model images, and recognizing characters corresponding to the cut-out character images based on each coincidence.

One or more embodiments of the invention is directed to a composite character model image constructed with a pair of character elements arrayed along a width direction registered while predetermined identification information is provided to the composite character model image.

In matching processing using the model image including the identification information, composite matching in which an image of a range including the character image being focused and an adjacent unprocessed character image is matched against the model image including the identification information is performed. A combination of the two character images included in the composite matching target range is recognized as a character corresponding to the matched model image including the identification information when the coincidence obtained by the composite matching is larger than a predetermined reference value.

For example, in the case that a horizontal character string is the recognition target, the composite character model image is registered with respect to a character having a configuration in which a pair of character elements is horizontally arrayed. In the character-recognition processing, after the characters are cut out, the matching processing against the model images of various characters is performed sequentially focusing on the cut-out characters along the character string. In this case, the image of the range including the character image being focused and the adjacent unprocessed character image is set to the matching target in the composite matching.

The coincidence is supposed to decrease when the combination of the character images in the composite matching target range does not correspond to the composite character, and the high coincidence is considered to be obtained when the combination of the two character images corresponds to the composite character.

Therefore, even if each character element of the composite character is independently matched against the model image to obtain the high coincidence for a model image of a character having a similar shape, because the composite matching result is preferentially used, the false recognition of the composite character can be prevented.

According to one or more embodiments of the invention, in the character-recognition method, in the matching processing against the model image including the identification information, single matching in which only the character image being focused is matched against the model image including the identification information is performed, and the composite matching is performed at least when the coincidence obtained by the single matching is lower than the reference value. Only the character image being focused is recognized as the character indicated by the model image including the identification information when the coincidence obtained by the single matching is larger than the reference value, and the combination of the two character images included in the composite matching target range is recognized as the character indicated by the model image including the identification information when the coincidence obtained by the composite matching is larger than the reference value.

Accordingly, in the case that each character element of the composite character is cut out as one character image, the coincidence of the single matching increases, and the recognition result is used based on the single matching, so that the composite character can correctly be recognized. In the case that each character element of the composite character is cut out as the individual character image, the recognition result is used based on the composite matching, so that each character element can be prevented from being recognized as the independent character.

A character-recognition device according to one or more embodiments of the invention includes: an image input unit configured to input as a recognition target a grayscale image generated by imaging a character string; a model storage unit in which model images of a plurality of kinds of characters are registered; a character cutout unit configured to cut out individual characters in the character string from the grayscale image input by the image input unit; a recognition unit configured to obtain of a character image being focused for each of the plurality of model images registered in the registration unit by sequentially focusing on cut-out character images to match the cut-out character images against the model images, and recognize characters corresponding to the cut-out character images based on each coincidence; and an output unit configured to output as a recognition result a character string in which the characters recognized with respect to the cut-out character images by the recognition unit are arrayed.

In order to realize the above recognition method, the character-recognition device further includes a registration processing unit configured to register to the model storage unit a composite character model image constructed with a pair of character elements arrayed along a width direction while predetermined identification information is provided to the composite character model image. The recognition unit includes a function of, in matching processing against the model image including the identification information, performing composite matching in which an image of a range including the character image being focused and an adjacent unprocessed character image is matched against the model image including the identification information, and the recognition unit is configured to recognize a combination of the two character images included in the composite matching target range as a character corresponding to the matched model image including the identification information when the coincidence obtained by the composite matching is larger than a predetermined reference value.

According to one or more embodiments of the invention, in the character-recognition device, the registration processing unit is configured to display a candidate character image to be registered in the model storage unit or the already-registered model image, and receive operation to select a target image to be registered as the composite character model image. The registration processing unit is configured to switch the display of the selected image to identification display with a predetermined identification mark and register the selected image in the model storage unit while providing the identification information to the selected image.

Accordingly, the user can assign the composite character necessary for the recognition and register the composite character as the composite character model image.

One or more embodiments of the invention further provides a program configured to operate a computer as the character-recognition device is provided.

According to one or more embodiments of the invention, the composite character constructed with the pair of character elements arrayed along the width direction can accurately be recognized without being influenced by the coincidence obtained by independently matching each character element against the model image or the size of the character element.

BRIEF DESCRIPTION OF THE DRAWINGS

FIGS. 2(1) and 2(2) are diagrams illustrating a screen displayed in character-recognition processing together with a change of display according to the processing according to one or more embodiments.

DETAILED DESCRIPTION

Figure 1:
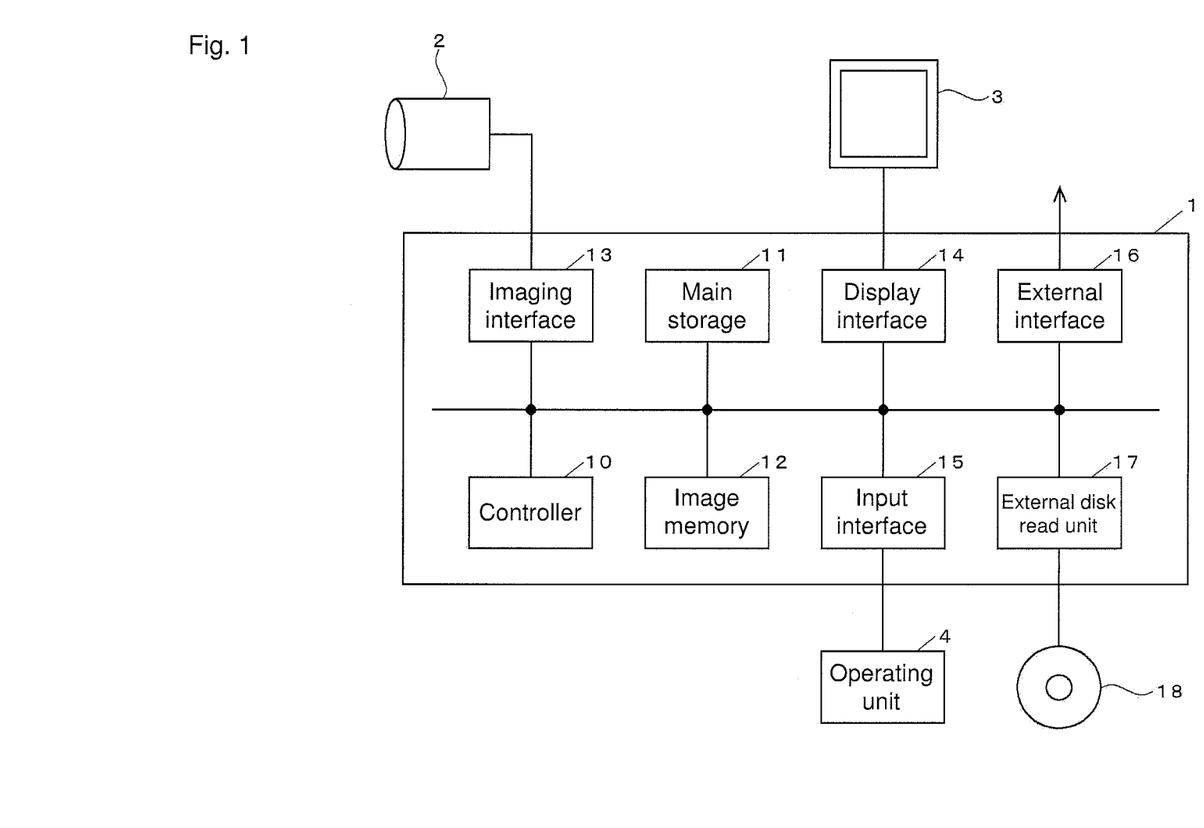
FIG. 1 is a block diagram illustrating a configuration of a character-recognition device according to one or more embodiments.
Figure 2:
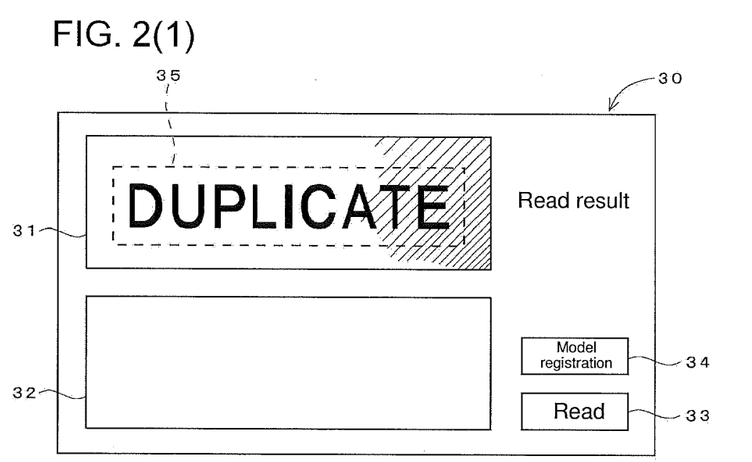

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. FIG. 1 illustrates a configuration example of a character-recognition processing device according to one or more embodiments of the present invention.

The character-recognition processing device images a character string, reads a character in a generated image, and outputs a read result. The character-recognition processing device includes main body 1 provided with controller 10, camera 2 capturing the image, display 3, and operating unit 4. For example, display 3 is constructed with a liquid crystal monitor, and operating unit 4 includes a mouse and a keyboard.

Main body 1 is a general-purpose computer device (personal computer), and includes controller 10 provided with a CPU, main storage 11, image memory 12, imaging interface 13, display interface 14, input interface 15, external interface 16, and external disk read unit 17.

For example, main storage 11 is a hard disk, and image memory 12 is a RAM board. A dedicated program read from external disk 18 by external disk read unit 17 and a font data used in character-recognition processing are registered in main controller 11. The image output from camera 2 is taken in imaging interface 13, and subjected to digital conversion. Then converted image data is stored in image memory 12.

The program stored in main storage 11 sets to controller 10 a function of cutting out the character from the image stored in image memory 12 one by one and a function of recognizing a content of the cutout character. A function as a graphical user interface presented to a user through the pieces of processing is also set to controller 10. By the graphical user interface function, controller 10 displays a screen including a processing target image on display 3 through display interface 14, and receives operation of operating unit 4 through input interface 15.

Figure 3:
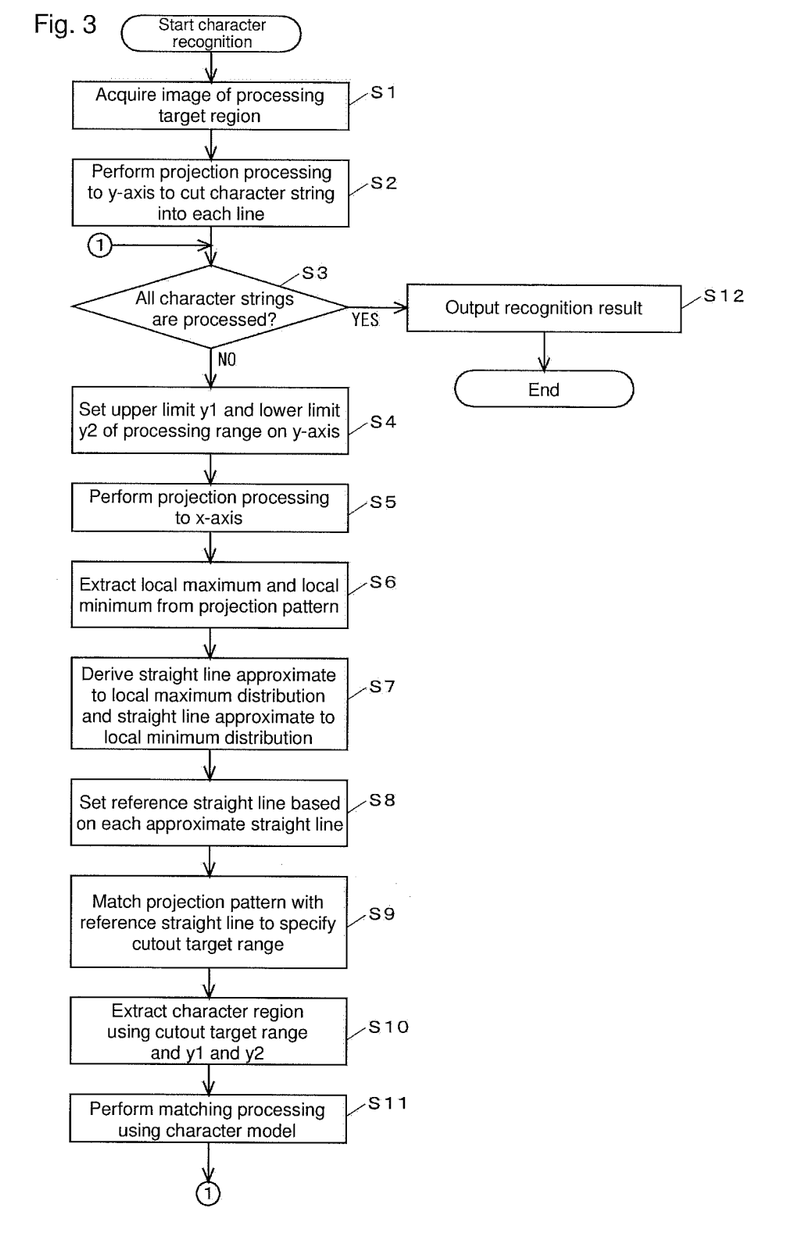
FIG. 3 is a flowchart illustrating a procedure of the character-recognition processing according to one or more embodiments.

According to one or more embodiments of the invention, in the character-recognition processing device, the operation to issue an instruction to read the character is received on the screen in which the processing target image is displayed, the character in the image is recognized by processing in FIG. 3, and a recognition result is displayed on the screen. The recognition result may be output to an external device through external interface 16.

FIGS. 2(1) and 2(2) illustrate an example of the screen displayed on display 3 for the purpose of the character-recognition processing.

Screen 30 in FIGS. 2(1) and 2(2) includes display field 31 for the character string of the recognition target image, display field 32 for an analysis result, read button 33, and model registration button 34. In FIGS. 2(1) and 2(2), it is assumed that shading is generated in a right end portion of the image, and the shade is expressed by a hatched line.

FIG. 2(1) illustrates the screen before start of read processing. Rectangular frame 35 indicating a processing target region set by the user is displayed in the image of image display field 31. The user decides a position and a size of rectangular frame 35 by mouse operation and the like to set the processing target region, and operates read button 33. By this operation, controller 10 recognizes a region corresponding to rectangular frame 35 as the processing target region, performs character-recognition processing (including character cutout processing and matching processing) to the image in the region, and changes the screen as illustrated in FIG. 2(2).

After the character-recognition processing, in image display field 31 of screen 30, each character is surrounded by frame 36 indicating a character region specified by the character cutout processing. The character read from the image in each frame 36 is displayed at the upper left of frame 36. The character string derived from the recognition results of respective character regions is displayed as a read result in a margin on the right of image display field 31. A name (F1) of a font most suitable for the character string is displayed below the character string.

Projection pattern P generated by projection processing for cutting out the character is displayed in blank display field 32 for the analysis result together with straight line M (hereinafter referred to as a "reference straight line M") set as a cutout reference.

The character-recognition processing will be described in detail on the assumption that the recognition target is the horizontal character string in which the characters are darker than a background.

FIG. 3 illustrates a schematic procedure of the character-recognition processing performed by controller 10.

The processing target region is set on the screen in FIGS. 2(1) and 2(2), and the character-recognition processing is started in response to the operation of read button 33. Initially, controller 10 acquires the image in the processing target region based on positional information on rectangular frame 35 (Step S1).

In FIGS. 2(1) and 2(2), the range including the character string of single row is assigned by way of example. However, actually the range including the character strings of a plurality of rows are sometimes assigned. In consideration of this point, in step S2, the projection processing is performed to a y-axis, and the character strings of a plurality of rows are segmented into each row by the generated projection pattern (Step S2).

The segmented character strings are sequentially set to the processing target to perform pieces of processing from Step S4.

In Step S4, upper limit y1 and lower limit y2 of a processing range on the y-axis are set based on the result of the character string segmenting processing (y-coordinates slightly outside the range determined to be the character string are set to y1 and y2). In Step S5, the projection processing is performed to an x-axis with respect to the image in the range from y1 to y2.

When the projection pattern along an x-axis direction is generated by the above processing, a local maximum and a local minimum are extracted from the projection pattern in Step S6, and a straight line approximate to a local maximum distribution and a straight line approximate to a local minimum distribution are derived in Step S7. In Step S8, based on the two approximate straight lines, reference straight line M is set in order to specify a cutout target range.

In Step S9, each value in the projection pattern is matched against reference straight line M to specify the cutout target range. In each cutout target range, based on the x-coordinates on the right and left edges of the cutout target range and coordinates y1 and y2 indicating processing target range on the y-axis, the character region is extracted (Step S10), and matching processing is performed using character models (character image models) included various pieces of font data (Step S11).

Then, the flow returns to Step S3, and the pieces of processing in Steps S4 to S11 are performed to an unprocessed character string when the unprocessed character string exists ("NO" in Step S3). When all the character strings are processed ("Yes" in Step S3), the flow goes to Step S12 to output the recognition result. The processing instructed by the user is ended when the recognition result is output.

In the projection processing performed to the y-axis (Step S2) in the above pieces of processing, a minimum density is projected for every line along the x-axis in the processing target region. Therefore, the density of the character image is projected from the line including any character image, and the density of the background is projected only from the line not including the character image, so that the range including the whole character string can accurately be extracted in a y-axis direction.

Figure 4:
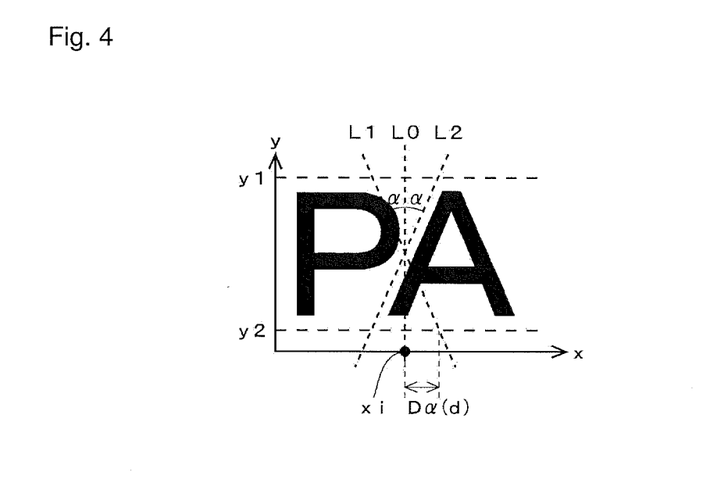
FIG. 4 is a diagram illustrating concepts of lines set for projection processing to a direction along a character string according to one or more embodiments.

In the projection processing performed to the x-axis along the character string (Step S5), each of a plurality of lines having different gradients are set at a projection target position, the minimum density of each line is extracted, and a maximum value in the extracted minimum density is used as a projection value. FIG. 4 illustrates a line setting method. In FIG. 4, xi is an x-coordinate of the projection target position, and y1 and y2 are an upper limit and a lower limit (obtained in Step S4) of the processing range on the y-axis.

Concepts of the projection lines set to coordinate xi will be described with reference to FIG. 4. Each line generated by rotating line L0, which passes through coordinate xi and is parallel to the y-axis, about a midpoint between a point (xi, y1) and a point (xi, y2) within a predetermined angle α on either side is the projection line with respect to coordinate xi. In an algorithm performed by controller 10, maximum value Dα of distance d is set instead of angle α because the gradient of the line is changed using distance d from coordinate xi at positions y1 and y2 of the processing target range in the y-axis direction.

In the case that only the line L0 along the y-axis is set to the projection direction like in usual projection processing, as illustrated in FIG. 4, sometimes a gap between the characters is narrow, the adjacent character projects partially in the narrow gap, and the projecting portion gets on line L0. Accordingly, the density of the character is projected to coordinate xi in FIG. 4, when the minimum density in line L0 along the y-axis is projected to coordinate xi based on the same technique as in the projection processing performed to the y-axis.

Therefore, according to one or more embodiments of the invention, the lines having various gradients are set, the minimum density is extracted in each line, and the maximum value in the extracted density is used as the projection value with respect to coordinate xi. In the image in which the background is brighter than the character, because the minimum density extracted on the line passing only through the gap is the maximum like in line L2 in FIG. 4, the minimum density being the maximum is projected to coordinate xi. Therefore, the density of the gap between the characters is reflected to generate the projection pattern in which a portion corresponding to the character constitutes a valley while a portion corresponding to the gap constitutes a peak.

Figure 5:
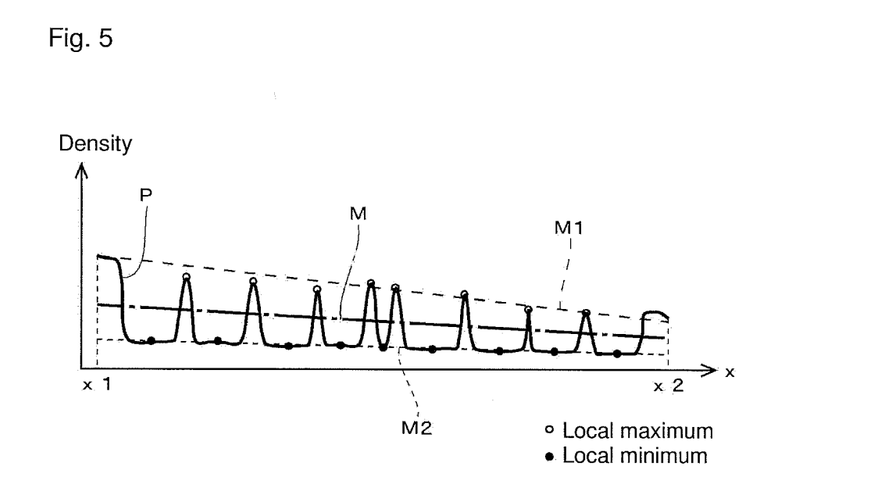
FIG. 5 is a diagram illustrating a method for setting a reference straight line with respect to a projection pattern according to one or more embodiments.

FIG. 5 illustrates an example (a horizontal axis indicates the x-coordinate and a vertical axis indicates the density) of projection pattern P generated by the projection processing together with a method for setting reference straight line M with respect to a projection pattern.

M1 and M2 in FIG. 5 are the approximate straight lines obtained in Step S7 of FIG. 3. As described above, straight line M1 approximate to the change of the local maximum and straight line M2 approximate to the change of the local minimum in the projection pattern are obtained in Step S7. In Step S8, for example, the x-coordinate is moved one by one to combine the points being focused corresponding to the x-coordinates of straight lines M1 and M2, a midpoint between these points is obtained by an average value of the densities at the points, a third straight line approximate to the distribution of the midpoints is set, and the third approximate straight line is used as reference straight line M.

The method for setting reference straight line M is not limited to the above method. For example, with respect only to coordinates x1 and x2 at both ends of the processing target region, after a midpoint between a corresponding point on straight line M1 and a corresponding point on straight line M2 is obtained, the midpoints may be connected to each other to set reference straight line M. Alternatively, based on the patterns of the local maximum and local minimum distributions, a height and the gradient of straight line M may be decided without setting straight lines M1 and M2.

Because the projection pattern in FIG. 5 is identical to that of field 32 in FIG. 2(2), the description is made with reference to FIG. 2(2). According to one or more embodiments of the invention, because the shading is generated at the end edge on the right in the recognition target image, the peak in projection pattern P decreases toward the right from the left, and a difference in density between the peak and the valley expressing the character also decreases. However, reference curve M also inclines toward the lower right from the upper left according to the density change, and reference straight line M is located at the position where the peak reflecting the gap and the valley reflecting the character can be segmented even in the area where the shading is generated. Therefore, based on reference straight line M, the range corresponding to individual characters can be cut out with no influence of the density change caused by the shading.

Figure 6:
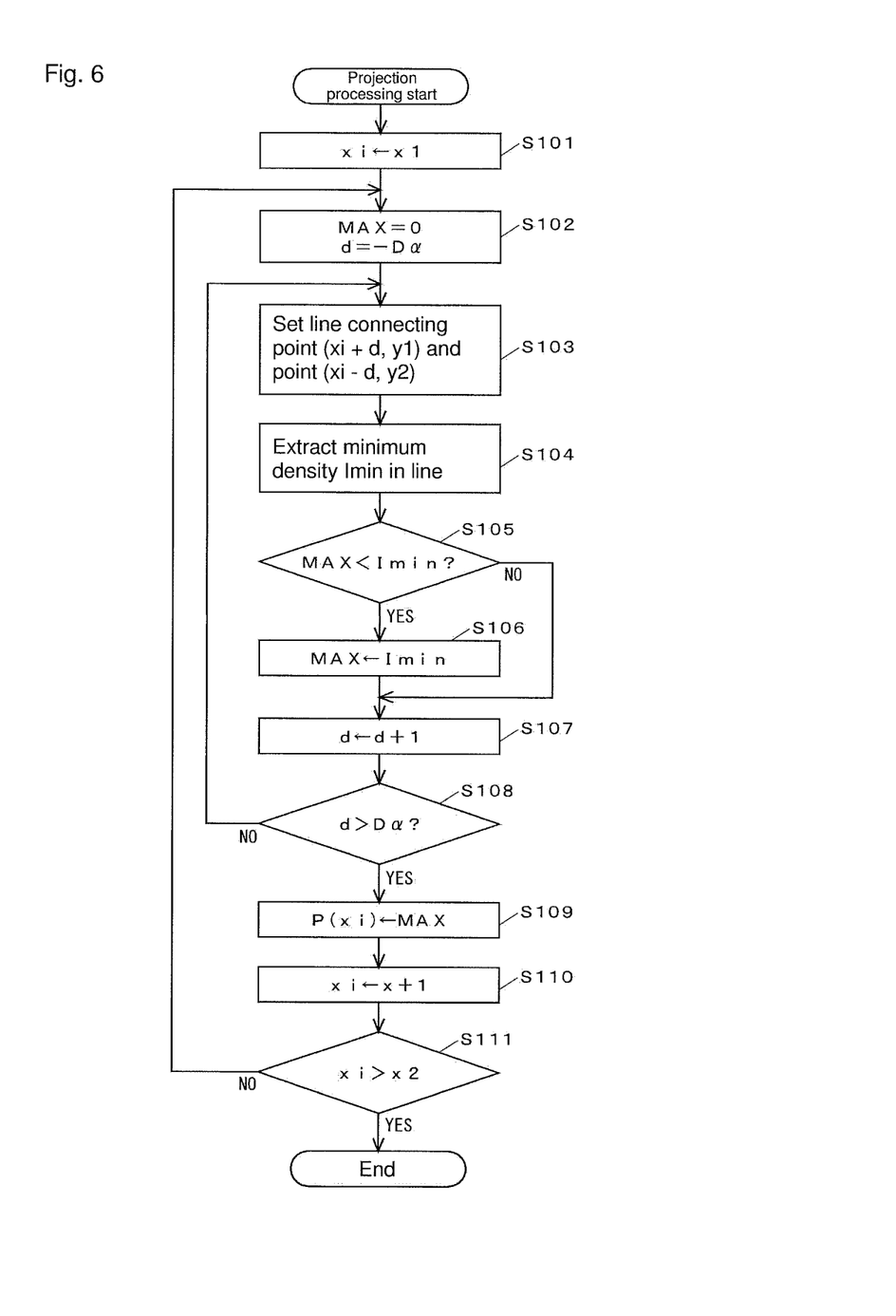
FIG. 6 is a flowchart illustrating a detailed procedure of the projection processing (Step S5 in FIG. 3) to the direction along the character string according to one or more embodiments.

FIG. 6 illustrates a detailed procedure of the projection processing (corresponding to Step S5 in FIG. 3) with respect to the x-axis. The procedure of the projection processing will be described with reference to FIG. 6 together with FIGS. 4 and 5.

In FIG. 6, similarly to the example in FIG. 4, it is assumed that xi is the coordinate at the projection target position on the x-axis. X-coordinate x1 at the left end edge of the processing target region is set to xi as an initial value (Step S101). Until xi becomes x-coordinate x2 at the right end edge of the processing target region, the following processing is performed while xi is moved pixel by pixel (Steps ST110 and ST111).

In Step S102, initial value of −Dα is set to displacement amount d while the initial value of 0 is set to maximum value MAX of the minimum density. Assuming that Dα is a positive value, the initial value of displacement amount d is a negative value.

A line connecting coordinate (xi+d, y1) and coordinate (xi−d, y2) is set in Step S103. According to the initial values of coordinate xi and displacement amount d set in Steps S101 and S102, the initially-set line is line L1 in FIG. 4. On the other hand, line L2 in FIG. 4 is set for d=Dα.

Displacement amount d is incremented by one until displacement amount d becomes Dα (Steps S107 and 108), and the processing in Step S103 is performed to displacement amount d in each time, whereby the line having the different gradient is set in each time within the range from line L1 to line L2. Minimum density Imin in the set line is extracted in Step S104. In the case that Imin exceeds maximum value MAX, maximum value MAX is rewritten by Imin (Steps S105 and S106). In the case that Imin is less than or equal to maximum value MAX ("NO" in ST105), maximum value MAX is maintained at a present value.

Thus, the plurality of lines having the different gradients are set to one point xi of the projection target, the minimum density is obtained in each line, and maximum value MAX is extracted in the minimum densities. When the processing is completed to all the lines ("Yes" in Step S108), maximum value MAX at that time is set to projection value of coordinate xi (Step S109).

The processing is performed to coordinate xi of each time, and xi is set to x2 of an end point to end the setting of the projection value, whereby an affirmative determination is made in Step S111 to end the projection processing.

On the other hand, in the case that the image in which the character is brighter than the background is set to the processing target, the maximum density is extracted in each line, and the minimum value in the extracted densities is selected as the projection value. The projection pattern in which the portion corresponding to the character constitutes the peak while the portion corresponding to the gap constitutes the valley is generated. Similarly to the technique in FIG. 5, two approximate straight lines M1 and M2 are set to the projection pattern, and reference straight line M is set at an intermediate position between straight lines M1 and M2. At the same time, the cutout target range is set to a range where the density is higher than that of reference straight line M in the projection pattern.

A character-recognition processing program registered in main storage 11 in FIG. 1 is set so as to perform the processing to the image in which the character is darker than the background. Alternatively, a program to perform the processing to the image in which the character is brighter than the background may be also incorporated, and which one of the programs may be used to perform the character-recognition processing according to the user selection.

According to one or more embodiments of the invention, reference curve M is set around the middle of the range of the local maximum distribution and the range of the local minimum distribution. Alternatively, the height of reference straight line M may be adjusted by a previously-set offset value.

According to one or more embodiments of the invention, on the screen in FIGS. 2(1) and 2(2), the user can also perform drag operation of the reference straight line in field 32 to change the height or the gradient of reference straight line M. Therefore, for failure in performing the processing of automatically cutting out the character, after changing reference straight line M based on a relationship between the peak and the valley of the projection pattern in field 32, the user can obtain the correct recognition result by operating read button 33 again.

Figure 7:
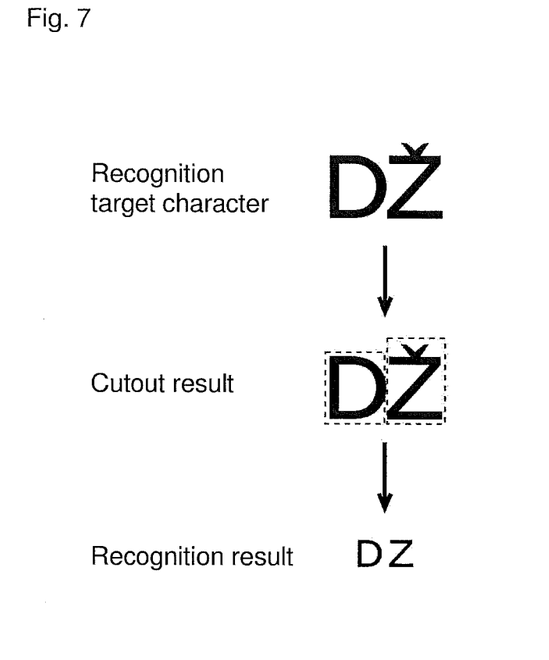
FIG. 7 is a diagram illustrating an example in which the composite character is erroneously recognized according to one or more embodiments.

As described above, according to one or more embodiments of the invention, when the narrowest gap exists between the characters, the gap and the characters can accurately be segmented from each other. However, in the case that the composite character including the two character elements horizontally arrayed with the gap is recognized, each character element is individually cut out, and the matching processing is performed in each character element. Additionally, as illustrated in FIG. 7, in a case where both the right and left character elements can independently be recognized as characters, because of a false recognition with a high coincidence in the matching processing, it is difficult to overlook the false recognition.

Therefore, according to one or more embodiments of the invention, an identification flag is set to the character model of the composite character including the character elements horizontally arrayed with the gap, the character model for the composite character is distinguished from the general character model using the identification flag, and the processing having a different content is performed depending on the type of the model in the matching processing.

Figure 8:
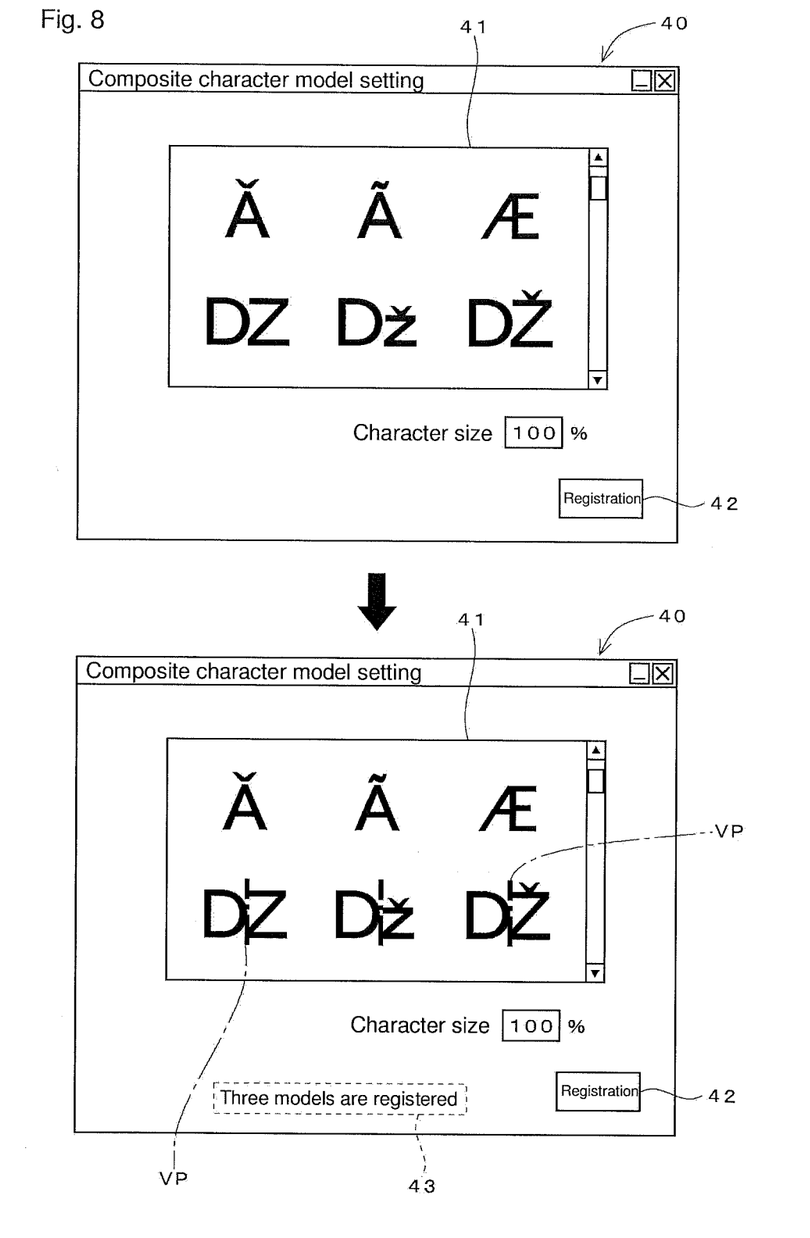
FIG. 8 is a diagram illustrating an example of a screen used to register a composite character model according to one or more embodiments.

FIG. 8 illustrates an example of the screen used to set a model for the composite character (hereinafter referred to as a "composite character model"). According to one or more embodiments of the invention, using the character models of various pieces of font data stored in main storage 11, controller 10 produces a list of character models registered as a special character, and displays setting screen 40 in FIG. 8 on display 3. Window 41 in which a list of special characters is displayed is arranged in a central portion of setting screen 40, and registration button 42 and the like are provided in the margin.

When the user performs click operation on a certain character in the list, vertical bar VP having a high-brightness color is displayed in the central portion in a horizontal width direction of the character. Vertical bar VP is a mark indicating that the character is selected as a candidate of a composite character model. However, a composite character flag is not set at this stage. Vertical bar VP disappears when the user performs the click operation again.

Using the workings, the user selects the character model that needs to be registered as the composite character model from the characters displayed in window 41, and the user operates registration button 42 after confirming a selection status based on the display of vertical bar VP. In response to the operation of registration button 42, a flag (hereinafter referred to as the "composite character flag") indicating the composite character is set to the selected character model. Message 43 indicating that the registration is completed is displayed in the lower portion of the screen.

Vertical bar VP is merely a mark, and is only to be set in the central position in the horizontal width of the selected character model. Accordingly, a mark in another form may be displayed instead of vertical bar VP.

The image registered as the composite character model is not limited to the font data. For example, a composite character included in an image of a print of a recognition target may be cut out and registered by the user operation. However, in this case, it is necessary to adjust a scale factor of the composite character model according to the size of the font data in the registration destination.

The processing of setting the composite character flag is not limited to one that is performed in response to the user operation. For example, controller 10 may analyze the font data to extract a character model having a horizontally-separated form, and set a composite character flag to the extracted character model. Alternatively, dictionary data of composite character models produced by a developer may properly be installed on main storage 11.

Figure 9:
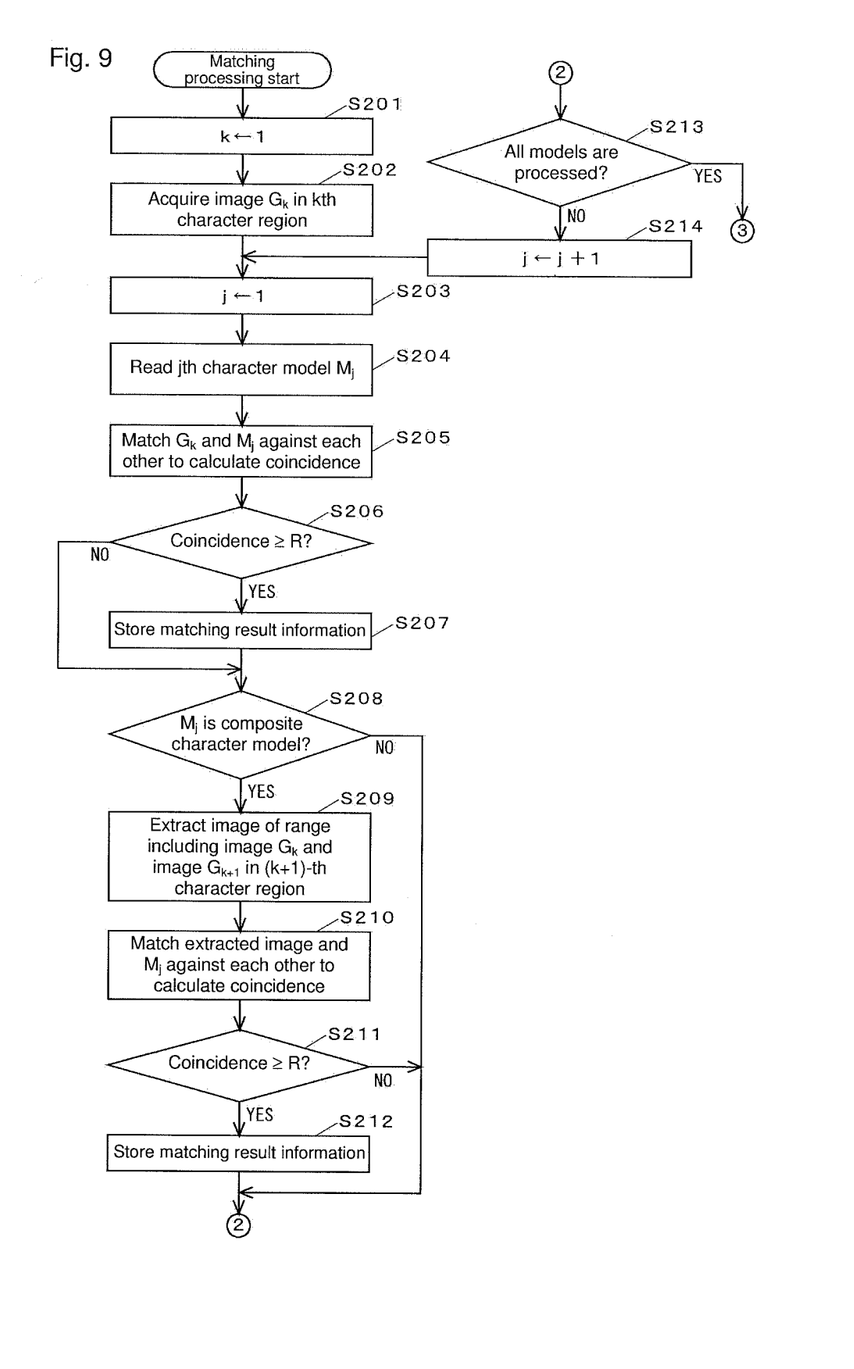
FIG. 9 is a flowchart illustrating a procedure of matching processing according to one or more embodiments.
Figure 10:
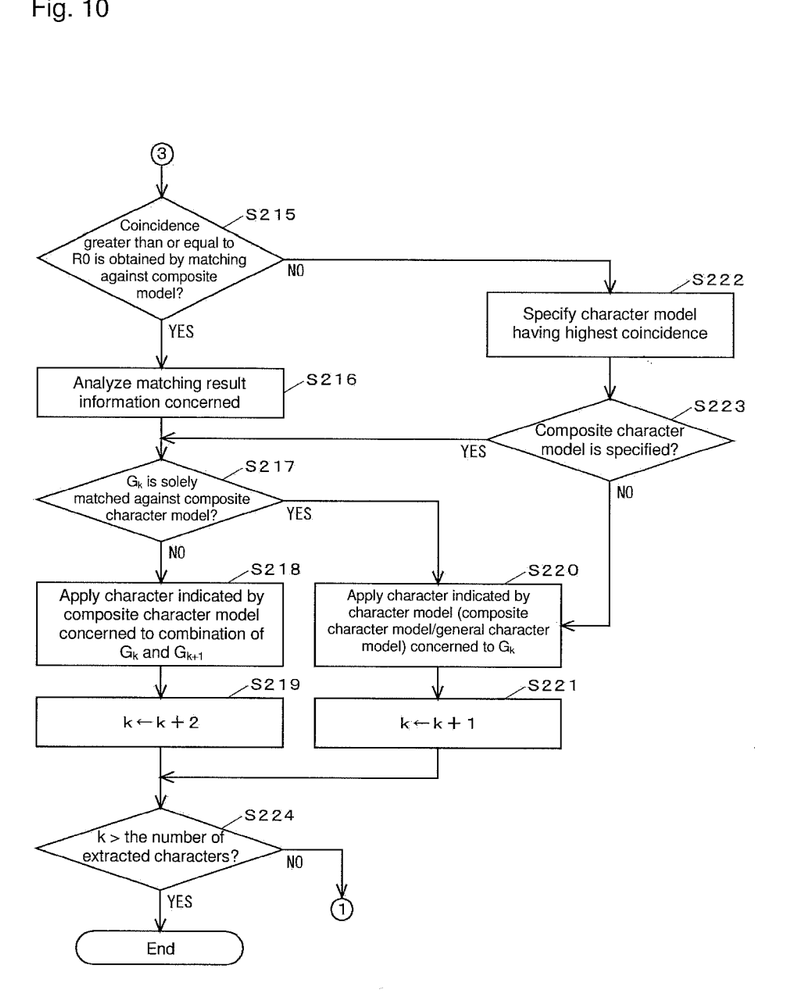
FIG. 10 is a flowchart illustrating a procedure subsequent to that in FIG. 9.

FIGS. 9 and 10 illustrate a detailed procedure of the matching processing (corresponding to Step S11 in FIG. 3) in which a character model group including a composite character model is used.

In the matching processing, the character regions extracted by the pieces of processing up to Step S10 in FIG. 3 are focused on one by one along the character string. The initial value of 1 is set to counter k indicating a character region to be focused (Step S201), and image $G_k$ of a kth character region is acquired (Step S202). Hereinafter, image $G_k$ is referred to as character image $G_k$.

The initial value of 1 is set to counter j specifying a matching target model (Step S203), and jth character model $M_j$ is read (Step S204). Character model $M_j$ and character image $G_k$ are matched against each other to calculate the coincidence therebetween (Step S205). The calculated coincidence is compared to predetermined reference value R (Step S206). In Step S205, the scale factor of character model $M_j$ is changed in a plurality of ways, the matching processing is performed in each scale factor, and the highest coincidence is used.

When the coincidence is greater than or equal to R ("Yes" in Step S206), matching result information (such as an identification code of character model $M_j$ used in the matching, the coincidence, and the scale factor of model $M_j$ at the time the coincidence is obtained) indicating the content of the matching is stored (Step S207). When the coincidence is less than R ("NO" in Step S206), the flow goes to Step S208 without storing the matching result information.

At this point, controller 10 checks whether the composite character flag is set to character model $M_j$. When the composite character flag is set ("Yes" in Step S208), the flow goes to Step S209 to extract an image of a range including character image $G_k$ and image $G_{k+1}$ (a character image that is located adjacent to character image $G_k$ and on which the character recognition is not performed yet) in (k+1)-th character region. The extracted image is matched against character model $M_j$ to calculate the coincidence therebetween (Step S210), and the coincidence is compared to reference value R (Step S211). In Step S210, similarly to Step S205, the scale factor of character model $M_j$ is changed in a plurality of ways, the matching processing is performed in each scale factor, and the highest coincidence is used.

When the coincidence is greater than or equal to reference value R ("Yes" in Step S211), the matching result information is stored (Step S212). In this case, the performance of composite matching covering the range to the adjacent character image $G_{k+1}$ is written as the matching result information in addition to the identification code of character model $M_j$, the coincidence, and the scale factor.

Character model $M_j$ of the matching target is changed by updating counter j until the matching against all the character models set as the matching target is ended (Steps S213 and S214), and the similar processing is performed to each character model $M_j$. A list of character models in which the coincidence of at least reference value R is obtained with respect to the character region being focused is produced based on the matching result information stored during the processing.

Subsequent matching processing will be described with reference to FIG. 10.

When the processing with a final character model is ended, controller 10 checks whether the information indicating that the coincidence of at least R0 higher than reference value R is obtained by the matching against the composite character model exists in the stored matching result information (Step S215). When the information concerned is found ("Yes" in Step S215), controller 10 analyzes the matching result information to check whether the information indicates that character image $G_k$ is solely matched against the composite character model (Steps S216 and S217). When character image $G_k$ is not solely matched against the composite character model, but the range including adjacent character image $G_{i+1}$ is matched against the composite character model to obtain the coincidence of at least R0 ("NO" in Step S217), the character indicated by the composite character model is applied to the combination of $G_k$ and $G_{k+1}$ (Step S218), and 2 is added to counter k (Step S219).

When the analyzed matching result information indicates that character image $G_k$ is solely matched against the composite character model to obtain the coincidence of at least R0 ("Yes" in Step S217), the character indicated by the composite character model is applied only to the character image $G_k$ (Step S220), and 1 is added to counter k (Step S221).

When the composite character model in which the coincidence of at least R0 is obtained does not exist ("NO" in Step S215), the character model in which the highest coincidence is obtained is specified (Step S222).

When the specified character model is the composite character model ("Yes" in Step S223), the similar procedure as described above is performed in Steps S217 to S221. In the case that the highest coincidence is obtained when the range including character image $G_k$ and adjacent character image $G_{k+1}$ is matched against the composite character model, the character indicated by the composite character model is applied to the combination of character images $G_k$ and $G_{k+1}$ (Step S218). In the case that the highest coincidence is obtained when character image $G_k$ is solely matched with the composite character model, the character indicated by the composite character model is applied to character image $G_k$ (Step S220).

When the highest coincidence is obtained for the general character model ("NO" in Step S223), the pieces of processing in Steps S220 and S221 are performed. Therefore, the character indicated by the general character model having the highest coincidence is applied to character image $G_k$.

As described above, in the case that the coincidence of at least R0 is obtained by the matching against the composite character model or in the case that the coincidence for the composite character model is higher than that for the general character model, the matching result obtained using the composite character model is preferentially used. In the case that the matching result used indicates that the matching is performed to the range including character image $G_k$ of the processing target and the adjacent unprocessed character image $G_{k+1}$, after the character indicated by the composite character model is applied to the combination of character images $G_k$ and $G_{k+1}$, 2 is added to counter k in Step S219. Character image $G_{k+1}$ is recognized together with character image $G_K$ by the count processing in Step S219.

According to the above processing, even if the composite character is cut out while horizontally separated, the high-accuracy matching processing can prevent the false recognition. Particularly, the recognition accuracy can considerably enhanced in recognizing the composite character having the form partially matched with a combination in (DZ) of general characters as illustrated in FIG. 7.

According to one or more embodiments of the invention, both the single matching intended only for the character image $G_k$ being focused and the composite matching intended for the rangecluding character image $G_k$ and adjacent unprocessed character image $G_{k+1}$ are performed in the matching processing using the composite character model image. Alternatively, the composite matching may be performed only when the coincidence obtained by the single matching is lower than reference value R0.

According to one or more embodiments of the invention, the character is cut out by the technique of projecting the minimum density within the projection target line. The similar matching processing can be applied when the character is cut out by general projection processing.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1 main body
2 camera 3 display
4 operating unit
10 controller
11 main storage
40 screen

The invention claimed is:

1. A character-recognition method comprising:
imaging a character string;
generating a grayscale image that corresponds to the character string;
cutting out, from the grayscale image, individual characters in the character string;
obtaining a coincidence of a character image that is being focused on for each of model images of a plurality of kinds of characters by sequentially focusing on cut-out character images to match the cut-out character images against the model images; and
recognizing characters corresponding to the cut-out character images based on each coincidence,
wherein a composite character model image comprising a pair of character elements arrayed along a width direction is registered while predetermined identification information is provided to the composite character model image, and
wherein, in matching against the model image comprising the identification information, composite matching, is performed, in which an image of a range comprising the character image being focused and an adjacent unprocessed character image are matched against the model image comprising the identification information, and a combination of the two character images comprised in the composite matching target range is recognized as a character corresponding to the matched model image comprising the identification information when a coincidence obtained by the composite matching is larger than a predetermined reference value.

2. The character-recognition method according to claim 1, wherein, in the matching processing against the model image comprising the identification information, single matching, in which only the character image being focused on is matched against the model image comprising the identification information, is performed, and the composite matching is performed at least when the coincidence obtained by the single matching is lower than the predetermined reference value, and
wherein only the character image being focused on is recognized as the character indicated by the model image comprising the identification information when the coincidence obtained by the single matching is larger than the reference value, and the combination of the two character images comprised in the composite matching target range is recognized as the character indicated by the model image comprising the identification information when the coincidence obtained by the composite matching is larger than the reference value.

3. A character-recognition device comprising:
an image input unit configured to input a grayscale image generated by imaging a character string;
a memory configured to register a plurality of kinds of characters;
a character cutout unit configured to cut out individual characters in the character string from the grayscale image;
a recognition unit configured to obtain a coincidence of a character image being focused on for each of the plurality of model images registered in a registration unit by sequentially focusing on cut-out character images to match the cut-out character images against the model images, and recognize characters corresponding to the cut-out character images based on each coincidence;
an output unit configured to output a recognition result in which the characters recognized with respect to the cut-out character images by the recognition unit are arrayed; and
a registration processing unit configured to register to the memory a composite character model image constructed with a pair of character elements arrayed along a width direction while predetermined identification information is provided to the composite character model image.

4. The character-recognition device according to claim 3, wherein the registration processing unit is configured to display a candidate character image to be registered in the model storage unit or an already-registered model image, receive operation to select a target image to be registered as the composite character model image, switch the display of the selected image to identification display with a predetermined identification mark, and register the selected image in the model storage unit while providing the identification information to the selected image.

5. The character recognition device according to claim 3, wherein the recognition unit comprises a function of, in matching processing against the model image comprising the identification information, performing composite matching in which an image of a range comprising the character image being focused and an adjacent unprocessed character image is matched against the model image comprising the identification information, and the recognition unit is configured to recognize a combination of the two character images comprised in the composite matching target range as a character corresponding to the matched model image comprising the identification information when the coincidence obtained by the composite matching is larger than a predetermined reference value.

6. The character-recognition device according to claim 5, wherein the registration processing unit is configured to display a candidate character image to be registered in the model storage unit or an already-registered model image, receive operation to select a target image to be registered as the composite character model image, switch the display of the selected image to identification display with a predetermined identification mark, and register the selected image in the model storage unit while providing the identification information to the selected image.

7. A character-recognition device comprising:
a memory;
a character cutout unit configured to cut out individual characters in a character string from a grayscale image generated by imaging the character string;
a recognition unit configured to obtain a coincidence of a character image that is being focused for each of a plurality of previously registered model images of a plurality of kinds of characters by sequentially focusing on cut-out character images to match the cut-out character images against the model images, and recognize characters corresponding to the cut-out character images based on each coincidence; and
an output unit configured to output as a recognition result in which the characters recognized with respect to the cut-out character images by the recognition unit are arrayed,
wherein the memory comprises a program configured to provide the character-recognition device with a registration processing unit configured to register to the model storage unit a composite character model image comprising a pair of character elements arrayed along a width direction while predetermined identification information is provided to the composite character model image, and wherein the recognition unit comprises a function of, in matching processing against the model image comprising the identification information, performing composite matching in which an image of a range comprising the character image being focused and an adjacent unprocessed character image is matched against the model image comprising the identification information, and the recognition unit is configured to recognize a combination of the two character images comprised in the composite matching target range as a character corresponding to the matched model image comprising the identification information when the coincidence obtained by the composite matching is larger than a predetermined reference value.

\* \* \* \* \*